Oct. 26, 1965    J. J. DAMON    3,213,973
HYDRAULIC SHOCK ABSORBER HAVING EXTERNAL
JOUNCE AND REBOUND PASSAGES
Filed June 4, 1964

JAMES J. DAMON
INVENTOR

BY John R. Faulkner
   Clifford L. Sadler

ATTORNEYS

United States Patent Office 3,213,973
Patented Oct. 26, 1965

3,213,973
HYDRAULIC SHOCK ABSORBER HAVING EXTERNAL JOUNCE AND REBOUND PASSAGES
James J. Damon, Dearborn, Mich., assignor to Ford Motor Company, Dearborn, Mich., a corporation of Delaware
Filed June 4, 1964, Ser. No. 372,452
1 Claim. (Cl. 188—97)

The present invention relates to automotive type hydraulic shock absorbers, and more particularly to a shock absorber that is stroke sensitive and has independent compression and rebound damping.

It is common practice in the construction of automotive suspension systems to provide hydraulic damping means to control body motions occurring during vehicle operation. A vehicle normally encounters a variety of road conditions varying from a country road with chuck holes to a smooth boulevard and, therefore, it has been necessary to compromise the shock absorber design in order to provide reasonably good damping characteristics for all of the wide range of road conditions that may be encountered. As a result, control at the extremes of operation are often less than perfect.

To provide adequate damping for maximum deflection, stiffness of operation is built into the shock absorber, however, such stiffness may result in undue harshness under boulevard operating conditions. The counter situation can also occur, that is, insufficient control for extreme deflection may result from providing a shock absorber that is intended primarily to accommodate a soft ride.

In view of the foregoing design conditions, it is an object of the present invention to provide a unique shock absorber adapted to accommodate a wide variety of operating conditions without compromise. A shock absorber according to this invention is designed to provide greater control at the end of both the rebound and compression strokes without sacrificing the desired operation in the central or low level valving range.

These objectives are achieved in part by providing mutual independence of both the compression and rebound damping. In order to improve control for reduction of harshness, damping is sensitive to piston position. These and further objects of the present invention will be fully comprehended from the following description and the accompanying drawings in which.

Figure 1:
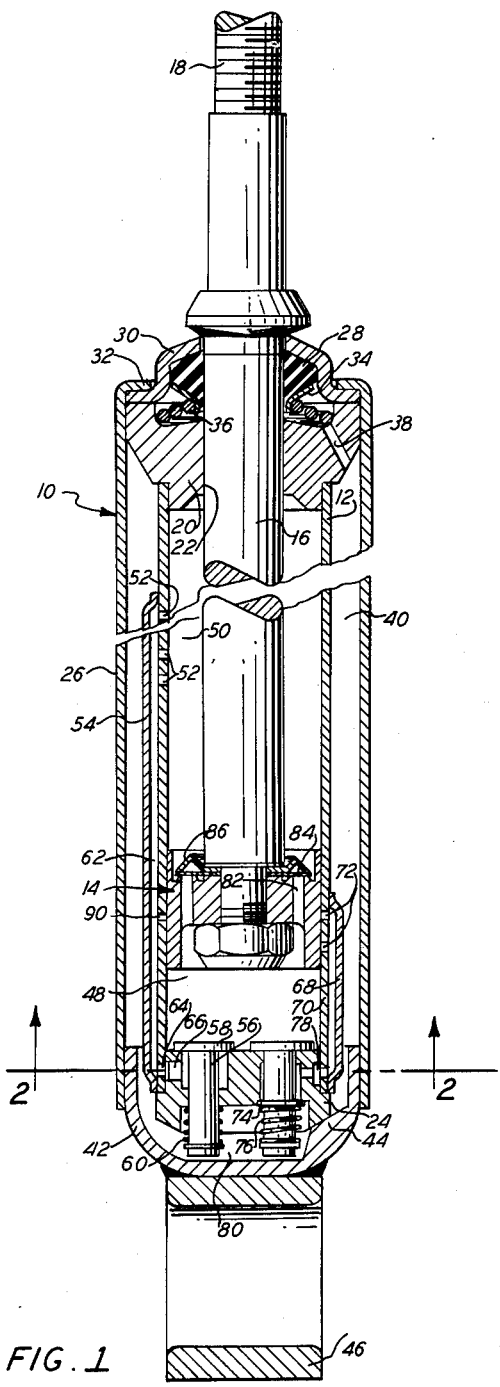
FIGURE 1 is an elevational view in section of a shock absorber constructed in accordance with the present invention.

Refering now to the drawings wherein the presently preferred embodiment of this invention is disclosed, FIGURE 1 shows a plunger type hydraulic shock absorber 10. The shock absorber 10 comprises a pressure tube 12 in which a piston assembly 14 is slidably received. The piston 14 is secured to the lower end of a piston rod 16. The upper end 18 is threaded so that it may be readily affixed to a sprung component of a vehicle such as a body member.

A closure member 20 seals the upper end of the pressure tube 12 and has a central opening 22 that slidably receives the piston rod 16. The lower end of the pressure tube 12 is closed by a valve cage 24. A reservoir tube 26 is concentrically positioned about the pressure tube 12 and is spaced therefrom at its upper end by the closure member 20.

A rubber sealing ring 28 surrounds the piston rod 16 above the closure member 20. The sealing ring is positioned in part by a cap member 30 that is retained by the end portion 32 of the reservoir tube 26. This end portion 32 is spun over to seal the cap 30 against the closure member 20. A washer 34 is pressed against the rubber seal 28 by a coil spring 36. Any hydraulic fluid that may leak through the clearance between the opening 22 in the closure member 20 and the piston rod 16 will be prevented from leaking out of the unit by the rubber seal 28. The fluid that does enter this area is drained back through a passage 38 to the annular space 40 between the pressure tube 12 and the reservoir tube 26. The annular space 40 between tubes 12 and 26 constitutes a reservoir chamber.

The lower end of the tube 26 and the reservoir chamber 40 are enclosed by a lower closure member 42 which is welded to the end of the tube 26. The closure member 42 is provided with inwardly extending projections such as 44 which function to space the valve cage 24 and pressure tube 12 concentrically with respect to the lower end of the reservoir tube 26.

A mounting ring 46 is welded to the lower end of the closure member 42 and serves as an attaching device for connecting the shock absorber 10 to an unsprung suspension component such as a suspension arm or axle housing.

The piston assembly 14 divides the pressure tube 12 into compression and rebound pressure chambers 48 and 50, respectively. The rebound chamber 50 is situated above the piston assembly 14 and the compression chamber 48 is situated beneath the piston. A series of axially spaced apart control orifices 52 are provided in the wall of the pressure tube 12 near its upper end. As will be explained later, these orifices provide control during the rebound stroke and are particularly effective for extreme damping requirements. They are, therefore, referred to as high level rebound orifices.

A channel-shaped piece 54 is welded to the exterior surface of the pressure tube 12 and functions as an axially extending passageway that interconnects the high level rebound orifices 52 with a low level rebound valve 56. Valve 56 is contained within the valve cage 24 and is of the poppet type having a head portion 58. Valve 56 is biased to a closed position by a coil spring 60. The channel member 54 provides communication between the high level orifices 52 and the low level rebound valve 56 by forming a passageway 62 that may be referred to as a low level rebound passage. Passage 62 connects through ports 64 and 66 formed in the pressure tube 12 and the valve cage 24. These ports 64, 66 are in communication with the valve passage of the low level rebound valve 56 which, in turn, may be opened under pressure to permit fluid to flow to the compression chamber 48.

A shorter channel member 68 is welded to the outside of the pressure tube 12 at its lower end and forms a compression low level passage 70. Passage 70 is in communication with the compression chamber 48 by means of compression high level orifices 72. In FIGURE 1, these orifices are shown closed by the piston assembly 14, however, when the piston is situated in its mean or design position these orifices are opened to the compression chamber 48. The lower end of the compression low level passage 70 communicates with the low level compression valve 74 which is spring pressed to a closed position by a spring 76. Aligned ports 78 are formed in the lower end of the pressure tube 12 and the valve cage 24 to permit communication between the exterior compression low level passage 70 and the valve passage sealed by the low level compression valve element 74.

The low level compression valve 74 is a check valve which permits fluid to flow from the compression chamber through the passage 70 to the reservoir area 80 situated beneath the valve cage 24. Area 80 constitutes a portion of the over-all reservoir 40. Thus, the low level compression valve 74 functions as a one-way valve controlling flow from the compression chamber 48 to the reservoir.

The piston assembly 14 is provided with a series of passages 82 that are sealed by a valve element 84 and a spring 86. These several components constitute a replenishing valve for the rebound chamber 50.

Figure 3:
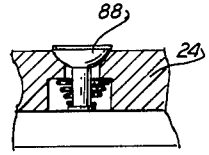
FIGURE 3 is a sectional view taken along section line 3—3 of FIGURE 2.
Figure 2:
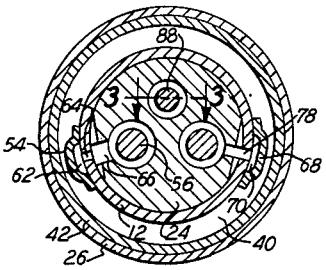
FIGURE 2 is a sectional view taken along section line 2—2 of FIGURE 1.

FIGURES 2 and 3 disclose a replenishing valve 88 situated in a valve cage 24. Valve 88 is spring pressed to a closed position and permits the flow of replenishing fluid from the reservoir to the compression chamber 48 during a rebound stroke.

The operation of this unique shock absorber will now be described. With the piston in the design or mean position and the stroke moving in the rebound direction or upwardly, the rebound chamber 50 is pressurized against the control established in the low level rebound valve 56 as the fluid is forced out of the series of orifices 52 and down the passage 62. The low level rebound valve 56 exhausts fluid into the compression chamber 48, thereby fulfilling part of the piston replenishing requirements. The remainder of the replenishing volume corresponding to the displacement of the piston rod 16 is drawn through replenishing valve 88 from the reservoir chamber 40.

The low level damping control for the rebound stroke is governed by the load of the helical spring 60 that presses the low level rebound valve 56 closed. Additional low level control may be provided by a so-called free flow orifice 90 that can be situated in the lower end of the pressure tube 12. If orifice 90 is provided, it should be in approximate alignment with the upper one of the compression high level orifices 72. With a free flow orifice 90, low level damping is then controlled by both the strength of the spring 60 and the size of the orifice 90.

As the piston 14 travels upwardly and closes off, one by one, the high level orifices 52 flow to the rebound valve 56 becomes increasingly restricted until the size of the uncovered orifices 52 determines control rather than valve 56. When the final orifice is closed, a hydraulic lock or stop is created and further travel of the piston assembly 14 will be prevented.

During the compression stroke, the piston assembly 14 is moving downwardly and fluid flows out of the compression chamber 48 in two directions. A portion of the fluid moves through the piston rebound replenishing valve passages 82 into the rebound chamber 50. An amount equal to piston rod displacement is forced out of the compression high level orifices 72, through the compression low level passage 70 to the reservoir position 80. The pressurized fluid flows against the control created by the load from the low level compression valve helical spring 76.

The required damping control for the compression stroke is obtained much the same as in the rebound stroke. Low level resistance is established by the spring load of spring 76 and the high level damping occurs through successive closing of the series of high level compression orifices 72.

The rebound valve passage 62 and the compression valve passage 70 are entirely separate and independent, thus permitting the control provided by the high level orifices 52 and 72 to be mutually independent. As previously stated, these orifices provide high level control while the spring pressed valves 56 and 72 provide low level control. This arrangement allows the shock absorber designer greater flexibility in the selection of the desired control curves. Rather than being a compromise, controls can be provided for extreme operation as well as for boulevard conditions.

The foregoing description presents the presently preferred embodiment of this invention. Modifications and alterations may occur to those skilled in the art that will come within the scope and spirit of the following claim.

I claim:

A telescopic plunger type hydraulic shock absorber having a pressure tube, a piston reciprocable within said pressure tube, said piston dividing said tube into rebound and compression chambers, elongated parallel mutually independent rebound and compression passageways extending exteriorly of said pressure tube, said passageways extending generally parallel to the axis of said piston rod, the exterior surface of said pressure tube comprising the inner wall of each of said passageways, a reserve fluid chamber, a spring pressed one-way compression chamber replenishing valve providing controlled communication from said reserve fluid chamber to said compression chamber, said piston having a spring pressed one-way rebound chamber replenishing valve providing communication from said compression chamber to said rebound chamber, compression control orifice means in the wall of said pressure tube near its lower end providing communication between said compression chamber and said compression passageway, a spring pressed compression valve providing communication between said compression passageway and said reserve fluid chamber to permit fluid flow from said compression chamber through said compression passageway to said reserve fluid chamber during a compression stroke of said piston, rebound valve means providing control communication from said rebound passageway to said compression chamber, rebound control orifice means situated in the wall of said pressure tube near its upper end providing communication between said rebound passageway and said rebound chamber permitting fluid flow during a rebound stroke of said piston from said rebound chamber through said rebound control orifices, said rebound passageway and rebound valve means to said compression chamber.

References Cited by the Examiner

UNITED STATES PATENTS

| | | | |
|---|---|---|---|
| 1,288,435 | 12/18 | Manierre | 188—88 |
| 1,578,678 | 3/26 | Norton | 188—97 X |
| 2,173,574 | 9/39 | Binder et al. | 188—88 |
| 2,500,708 | 3/50 | Rossman | 188—88 |
| 2,527,034 | 10/50 | Rossman | 188—88 |

BENJAMIN HERSH, *Primary Examiner*,

ARTHUR L. LA POINT, *Examiner*.